Jan. 30, 1945.　　　　J. W. RUZICKA　　　　2,368,380
SHAFT SEAL
Filed Sept. 24, 1942
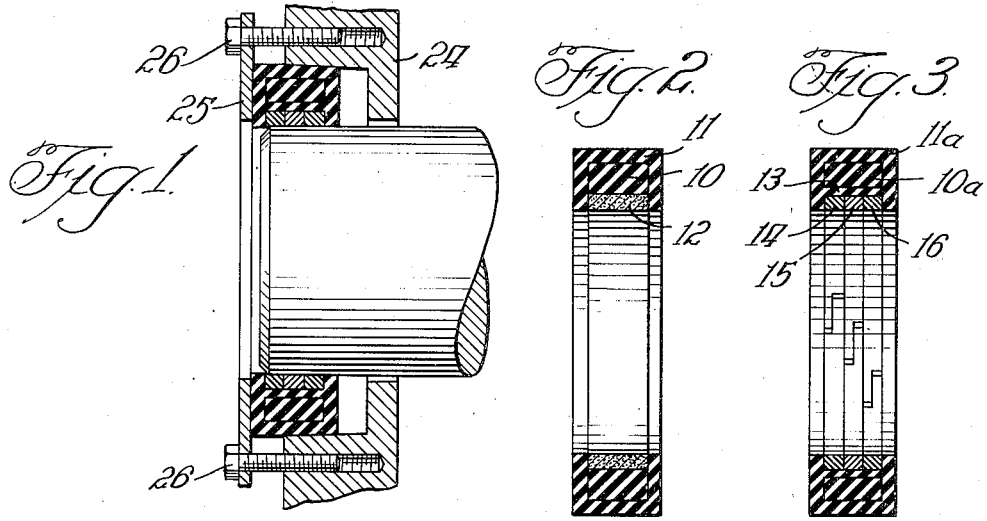
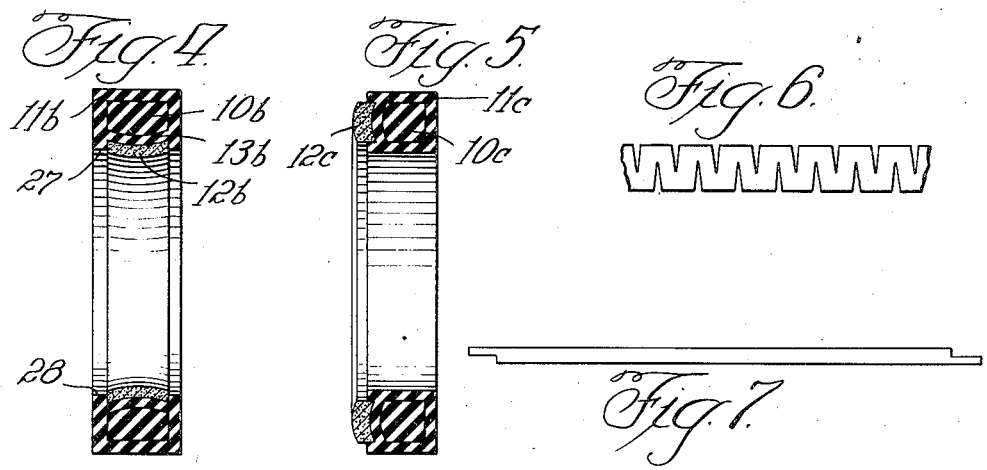
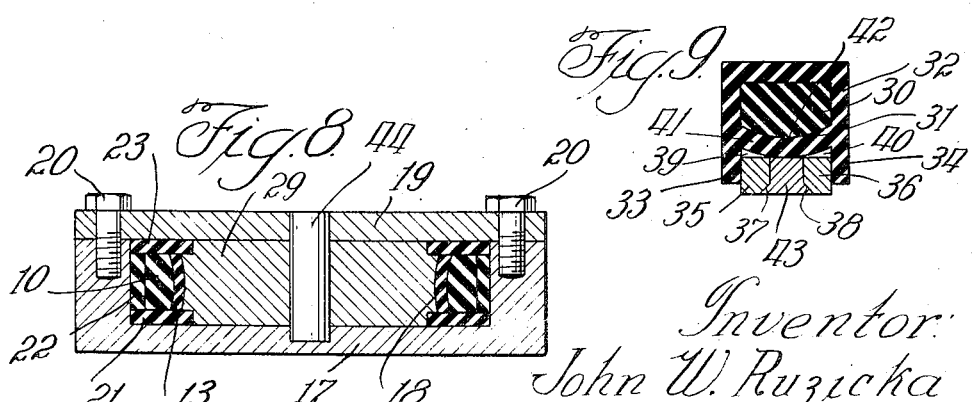
Inventor:
John W. Ruzicka Patented Jan. 30, 1945

2,368,380

UNITED STATES PATENT OFFICE 2,368,380

SHAFT SEAL

John W. Ruzicka, Glen Ellyn, Ill.

Application September 24, 1942, Serial No. 459,479

6 Claims. (Cl. 288—2)

This invention relates to shaft seals and to a method of making the same. More particularly, applicant's seals are designed for use with a rotatable shaft wherein the seepage of a fluid along the surface of the shaft in an axial direction is not assisted in any way by an axial movement of the shaft as, for example, is the case with a reciprocating shaft. While applicant's seals may be used on a reciprocating shaft, they are not designed as substitutes for stuffing boxes.

Seals for rotatable shafts may be classified in two groups, namely those seals which include a metallic housing machined very exactly to a selected size for mounting in a machined seat in a casting, and those seals of a flexible or resilient nature which are held in position by pressing them into a socket or seat and which may be used as replacement parts in the metallic housing type. These resilient seals are less expensive to manufacture because no machining is involved. Applicant's invention is of the resilient type.

Resilient seals must possess certain characteristics. They must fit tightly around a shaft and they must seat tightly in whatever is to hold them in fixed axial position with respect to the shaft. Moreover, that portion of a seal which engages the shaft must be made of wear resisting material which is very stable in the presence of petroleum compounds and other fluids that ordinarily would be in a position to work along a shaft. These resilient seals therefore must possess means for contracting around a shaft while at the same time possessing sufficient resistance to the penetration of petroleum compounds and other fluids that the functioning of the contracting means is not impaired by such fluids.

Resilient seals have not met these desiderata adequately for several reasons. If the seal is made of rubber, petroleum compounds quickly decompose it and render the seal useless. On the other hand, if the seal is made of a synthetic rubber highly stable in the presence of petroleum compounds, nevertheless, in order to get the proper compressibility, the synthetic rubber has to have such a degree of porousness that it absorbs the petroleum compounds, or other fluids, and becomes water- or fluid-logged.

The first object of this invention is to provide a resilient rotatable shaft seal having an annular core of compressible material completely protected by an outer casing of resilient, non-porous material, the two materials being tightly bonded to each other, with sealing material or sealing members around the inner wall of the seal for engaging a shaft. In this construction, applicant provides a seal having an inside diameter slightly less than the outside diameter of the shaft to which it is to be fitted. The seal may be forced over the end of a shaft, the shaft engaging a part of the casing and the sealing material or members while the compressible core exerts an even pressure upon the sealing material or sealing members against the shaft.

As an incident to the foregoing object, applicant provides a method of making such a shaft seal. The important step in applicant's method resides in positioning against the mold walls a casing composition either precured or capable of curing to a non-porous state and characterized by great stability after curing in the presence of petroleum compounds, while positioning centrally of the casing an annulus core of highly compressible, porous material of such a nature that it will bond to the casing during the curing step.

Another object of this invention is to provide a resilient seal having considerable structural strength. In one form of the invention, applicant uses as his shaft engaging material a mixture of materials which will bond to the casing and to the compressible core, thereby resulting in a seal which, while not homogeneous through its entire cross section, is nevertheless an integral whole. Thus, applicant uses a mixture of babbitt, asbestos shreds, graphite and synthetic rubber cement, which constitutes the material which will engage the shaft surface. This mixture is positioned in the mold prior to curing, and after curing, being impervious to fluids, will prevent the penetration of fluids to the compressible core and hence, will prevent the fluid-logging of the core. A partition of casing material between this shaft engaging material and the compressible core is therefore unnecessary.

On the other hand in a preferred form of applicant's invention, the shaft engaging portion of the seal consists of a plurality of rings made of thermo-setting materal, such as a phenol condensation product, and there may be one comparatively soft ring having high fluid absorptive powers, as for example, a woven asbestos, graphite packed ring. These rings will not bond during curing to the compressible core or to the casing and in fact are not positioned in the mold during curing. Moreover, they will not seal the compressible material from fluids. In this type of seal, therefore, applicant provides a layer of casing material between these rings and the compressible core. This layer of casing material or partition is mounted in the mold with respect to the remainder of the casing in such a way as to produce an annular recess around the inner wall of the seal. This recess has retaining walls so that the rings may be slipped into the recess and held in proper position.

A further object of this invention is to shape the compressible core and material engaging the shaft in such a way that when the seal is expanded over a shaft and the compressible material compressed, it will react primarily against the shaft engaging material to hold it tightly against the shaft and only to a lesser extent against other parts of the seal casing.

These and such other objects as may hereinafter appear are obtained in the various embodiments of the invention shown in the accompanying drawing comprising one sheet, wherein:

Figure 1 illustrates applicant's seal being forced into an annular seat around a shaft;

Figure 2 is a sectional view of one type of seal employing applicant's invention;

Figure 3 is a sectional view of a seal employing a plurality of rings;

Figure 4 is a sectional view of a seal wherein the compressible core is of a size and shape as to bow inwardly the shaft engaging portion of the seal;

Figure 5 is a seal constructed like the seal in Figure 4 but designed to engage the flat surface of a disc;

Figures 6 and 7 illustrate developed shaft bearing surfaces of the type used in the seal shown in Figure 3;

Figure 8 is a sectional view of a mold for assisting in describing the method of constructing applicant's seal shown in Figure 3; and Figure 9 is a section through another improved form of seal.

Applicant's invention seeks to provide a highly compressible core covered with a thin casing of comparatively non-porous, fluid impervious material which is highly stable in the presence of petroleum compounds. Referring to Figure 2, this compressible core is indicated by the numeral 10 while the casing is represented by the numeral 11. The material of which the seal itself is made, that is the shaft engaging portion, hereinafter to be described, is indicated by the numeral 12. Each one of these elements performs a specific function. The compressible material 10, which occupies the center and bulk of the cross sectional dimensions of the seal, is designed to exert a compressing force upon the material 12 when the material 12 has been stretched slightly over a shaft. The material 12, on the other hand, possesses long life qualities with reference to the rotating shaft. The material 11 performs the function of protecting the compressible material 10 from the penetration of fluids and resultant fluid-logging thereof or if the compressible material is natural rubber, prevent petroleum compounds from decomposing the same. In the seal shown in Figure 2, the casing 11 extends over the side walls of the material 12.

This construction is carried out substantially in all of the seals illustrated. Referring to Figure 3, which illustrates an improved form of applicant's seal, the compressible material 10a has been reduced in size and the casing 11a includes a thin web-like portion 13 between the compressible material 10a and three seal rings 14, 15 and 16. The justification for the web wall 13 of casing material used in the form shown in Figure 3 lies in the fact that the rings 14, 15 and 16 will not prevent the penetration of fluid to the compressible material unless such a partition as 13 is provided. These rings 14, 15 and 16 being made of metal or a thermo-setting plastic will not bond to the casing 11a during a curing process.

Similarly, the seal shown in Figure 4 has a compressible core 10b, casing 11b, web 13b and shaft engaging material 12b. The seal shown in Figure 4 is identical to that shown in Figure 2 with, however, the addition of the web 13b and with the exception that the compressible material 10b has a convex inner surface. In the seal shown in Figure 5, the sealing surface is in a plane at right angles to the shaft, and hence ordinarily is engaging some sort of a rotating flat surface such as a disc. Here again there is the compressible core 10c, the casing 11c and the bearing surface material 12c.

As illustrated in the drawing, there is a sharp demarcation surface between the compressible core 10 and the inside surface of the casing 11. In fact no such sharp demarcation exists. One of the factors controlling the selection of materials for the core 10 and the casing 11 is that the two materials must be capable of establishing between themselves a bond so tight that after curing it will be impractical to separate the casing from the core along the surface of joinder. This is important in applicant's invention because seals are subjected to lateral strains, that is strains imposed by forces moving parallel to the axis of the rotating shaft, sometimes caused by the pressure of fluids, and if the various layers of applicant's seal can work loose or slip their surfaces, the seal will very likely become unusable. The demarcation lines in the drawing between the core material 10 and the casings 11, therefore, are illustrative only. The same is true of the demarcation line between the shaft engaging material 12, on the one hand, and the compressible core material 10 and casing 11 on the other. As described hereinafter, referring to the seal shown in Figure 2, the material 12 contains a mixture of materials such as babbitt and graphite held together by shreds of asbestos and a synthetic rubber cement which during the curing step will bond to the core 10 and casing 11. This mixture of materials is fluid impervious after curing and therefore will protect the core 10. On the other hand the lines of demarcation between the rings 14, 15 and 16 and the casing 11a and casing web 13 do identify a definite surface because these rings do not bond to adjacent surfaces.

Applicant's method of making the seal may be followed by referring to Figure 8. The numerals 17 and 29 identify two parts of a mold having an annular recess 18 and held in assembled relationship by a stud 44. A cover plate 19 may be held to the mold 17 by any suitable means such as the cap screws 20. In making a seal such as that illustrated in Figure 9, applicant lays in the bottom of the annular recess 18 a flat ring 21 of raw synthetic rubber so calendered that upon curing, it will be resilient, non-porous, and fluid impervious. Against the outer and inner walls of the recess 18 are placed bands of casing material which form the outside periphery 22 of the seal and the partitioning web 13. Between the band 22 and the web 13 is disposed a core 10 of raw synthetic rubber as calendered and treated with chemicals that upon curing it will expand and assume a spongelike structure highly porous, highly compressible, and elastic. This core 10 bonds tightly to the casing material 21 and 22. Closing the top of the recess is a flat ring 23 of casing material. The top 19 is positioned and the seal cured in a conventional manner. Upon removing the top 19 and the mold portion 29, the seal being flexible may be sprung from the mold.

Upon curing, a tight bond will be established between the surfaces of the casing material and the compressible core 10. Upon removal from the mold, the seal, if cut through, will at first appear to be a homogeneous whole. Upon inspection, however, it will be seen that the inside core 10 is much more porous and compressible than the casing. This type of seal is designed for a shaft having a diameter slightly in excess of the diameter of the seal. Thus, a seal having a 1⅛-inch inside diameter will be used on a shaft having a one-inch diameter. In such a case, the seal will be forced over the shaft, as illustrated in Figure 1 thereby spreading the rings which in turn compress the compressible core, which being elastic resists and thereby presses the rings 14, 15 and 16 against the shaft. Again referring to Figure 1, the seal may be forced into a housing seat 24 which has a diameter slightly less than the outside diameter of the seal. Here again the compressible material 10 will function to hold the seal in place, although it will probably be assisted by a cap plate 25 held to the casting by any suitable means such as the cap screw 26 and which in Figure 1 is shown in use as a means of forcing the seal in operable position.

The rings 14, 15 and 16 are positioned after the seal has been removed from the mold.

This same method of manufacture applies to the various forms of seals shown. Where it is desired to make a seal such as that shown in Figure 2, the material in the shaft engaging band 12 may be a mixture of babbitt, asbestos shreds, graphite and synthetic rubber cement, and at the time of placing in the mold may be in a fairly viscous state. It will be readily appreciated that the steps described in this paragraph will enable one to make one of applicant's seals of the type shown in Figure 5. After the mold has been filled with material the whole may be cured, as by heat, in the conventional manner.

One form of applicant's seal which shows up well under test is illustrated in Figure 4. In this figure, the compressible core has an inwardly directed concave portion, which being covered with an even thickness of casing web 13b and an even thickness of shaft material 12b, which latter is very flexible itself and is to be contrasted with the comparative inflexibility of the corresponding material in the seals shown in Figure 3, gives to the shaft bearing material an inwardly convex surface. In this type of seal, it is intended that the inside diameter of the casing portion, that is the distance from the points 27 to 28, should be only slightly less than the diameter of the shaft for which the seal is intended. The principal forcing that will occur, therefore, will be on the shaft bearing material 12b which in turn will communicate this to the compressible core 10b. It is evident by looking at the cross section of the seal in Figure 4, that the effect of this pressure on the core 10b will be to cause the elastic core to exert its maximum force against the shaft bearing material 12b at its central point, which is exactly what is desired. By experiment, it has been noted, what was long theoretically expected in the case of the seals shown in Figures 2 and 3, that compressing the core tends to cause the core to expand in all directions and thereby distort the casing walls. If the seat in which the casing walls rest is tight, this effect may be defeated. It is desirable to minimize distortion of the casing walls, however and the seals shown in Figures 4, 5 and 9 partly do this.

As for the materials actually used by the applicant for the various parts of the seal, the compressible, elastic material is at the time it is placed in the molds, a raw synthetic rubber which has been treated with a chemical such as sodium bicarbonate, which upon curing will cause the rubber to become spongelike, that is porous. Applicant has used a synthetic rubber called neoprene, a trade-mark name given to its product by du Pont de Nemours, and also Thiokol, a trade name given to a synthetic rubber made by Thiokol Corporation of Yardville, New Jersey. A buna synthetic rubber could be used, and indeed any synthetic rubber which can be so calendered before curing and treated with chemicals that upon curing it will expand into a spongelike condition. Applicant is using a synthetic rubber for the core partly because he is using a synthetic rubber for the casing. Ordinary rubber could be used for the core whenever the core is completely protected by a synthetic rubber. It is of course understood that ordinary rubber is subject to decomposition by petroleum compounds and for that reason is not of great value as a seal unless protected. Where the compressible core 10 is completely sealed by a synthetic rubber casing 11, which synthetic rubber casing is resistant to petroleum compounds, a natural rubber core could be used.

The material used in the casing 11 is also a synthetic rubber and it must be of a type which is resistant to petroleum compounds and fluid impervious. Both neoprene and Thiokol are resistant to petroleum compounds, that is, very stable in the presence of ordinary oil and not subject to decomposition, moreover, they are impenetrable so that fluids cannot pass through them to the compressible core, either to fluid-log the core or to decompose it if it is made of ordinary rubber. The casing layers 21, 22 and 23, see Figure 8, are cut from a strip of calendered raw synthetic rubber which upon curing will be tough and impervious to fluids.

It is not thought necessary to describe the actual ingredients of the rubber for the reason that any rubber company can mix up an appropriate batch of rubber required to do the job heretofore described. Moreover, applicant is advised that various ingredients may be mixed with the raw synthetic rubber to produce the spongelike structure of applicant's core after curing.

As for the ingredients used in the mixed shaft bearing material 12 shown in Figures 2 and 4, applicant has mixed babbitt, asbestos shreds and graphite with a neoprene cement and packed the material into the mold by means of a spatula, although this material also could be so calendered by calendering machines that it could be laid out in a viscous flat sheetlike raw rubber. It is, of course, necessary that the material 12 be capable of bonding to the casing 11 and core 10 and upon hardening be impervious to fluids, if the construction shown in Figure 2 is to be used. If this mixture will pass fluids to the core 10, it is important that a web such as 13b in Figure 4 be used. The mixture 12 must be characterized when cured by low friction or anti-friction qualities.

In Figure 9, applicant shows a cross section through a preferred form of seal. The core 30 having an inwardly directed convex surface 31 is similar to cores heretofore described and is completely surrounded by a casing 32 which has flanged walls 33 and 34 and comes out of the mold in this shape. Between the flanged walls 33 and 34, after the seal has cooled, are positioned two rings 35 and 36 having their inwardly directed adjacent ends chamfered at 37 and 38. Into the space between these two rings 35 and 36 is positioned a woven asbestos, graphite packed ring 43 which has great ability to absorb oil. It will be noted that the outer periphery of these three rings are substantially flat and that consequently there is on each side of the channel made by the walls 33 and 34 open spaces 39 and 40. In the case of a seal to fit a two-inch shaft, the inside diameters of the rings unmounted will be about one and $15/16$ of an inch and the Bakelite rings will be split to permit expansion and contraction. The open channels 39 and 40 may be $\frac{1}{32}$ to $\frac{1}{16}$ of an inch deep, that is measured radially of the axis of the seal. When the seal is forced over a shaft as illustrated in Figure 1, the rings will be expanded outwardly and will tend to flatten the web 41, see Figure 9, to the configuration of the web shown in Figure 1, thereby eliminating the channels 39 and 40. The compressible material will be most confined at the point 42 and hence, the core will exert its greatest pressure toward attaining its natural shape centrally of the ring 43.

It is contemplated that the rings 35, 36 and 43 will be cemented in the annular channel of the seal, in which case the spaces 39 and 40 will be partly or fully filled with cement. This will provide a firmer seal construction.

The rings illustrated in Figure 3 may be made in various ways. In Figure 6 there is illustrated a continuous band ring with a plurality of V notches extending in from one side and staggered with respect to a like plurality of V notches extending in from the other side. The V notches extend beyond the center line of the ring and it is quite apparent that a small degree of compressibility or expansibility to enable the ring to fit tightly around the shaft will be permitted.

From the invention, applicant attains certain desirable results and advantages. In the first place, the life of the compressible core will not be ampaired by the penetration of the petroleum compounds which fluid-log the core. Moreover, the close bonding of the various materials making up applicant's seal provide for a unitary flexible seal which possesses superior ability to hold its shape. These two advantages combine to provide a seal which will withstand increased pressures. Moreover, when applicant's type of seal has mounted within its inner wall one or more long wearing rings made of metal or some phenolic condensation product such as Textolite or Bakelite, a very tight connection is established between the seal and the shaft. Finally, the employment of a compressible core having a volume when the seal is unmounted in excess of what the volume can be when the seal is mounted on the shaft for which it is intended, results in a seal which will apply to the shaft engaging material a uniform pressure all the way round and hence establish that tightness which will prevent the passage of fluid along the shaft past the seal.

Having thus described my invention, what I claim as new and desire to secure by Letters Patent of the United States is:

1. In a seal consisting of a compressible core in bonded engagement with and protected on all sides by a resilient casing highly impervious to the penetration of fluids, said casing having a recess on its inner side, within said recess a continuous ring of low friction material having a plurality of notches spacedly cut in from one side to a point beyond the mid-point of the ring and staggered with respect to a like number of notches cut thereinto for a like distance from the other side of the ring whereby the ring may be slightly expanded or contracted in mounting the same on a shaft.

2. A shaft seal comprising an annular core of compressible, elastic material, the surface of said core inwardly directed toward the axis of the seal being convex when viewed in section, a protective layer of synthetic rubber highly impervious to the penetration of fluids over said annular core, a circular recess in the protective layer around the inner wall of the seal, a stiff ring against each outer wall of the recess, and a fibrous packing ring therebetween.

3. A shaft seal comprising an annulus of compressible material and a casing of oil resisting elastic material bonded to all surfaces of said annulus, said casing being provided with flanges forming a U-shaped channel adapted to receive shaft engaging material.

4. A shaft seal comprising an annulus of compressible material and a casing of synthetic rubber bonded to all surfaces of said annulus, said casing being provided with flanges forming a U-shaped channel adapted to receive shaft engaging material.

5. A shaft seal comprising an annulus of compressible material, one wall of said annulus being convex, and a casing of oil resisting elastic material bonded to all surfaces of said annulus, said casing being provided with a pair of flanges, one on each side of the convex wall of the annulus forming therewith a channel adapted to receive shaft engaging material.

6. A shaft seal comprising an annulus of compressible material, a casing of oil resisting elastic material bonded to all surfaces of said annulus, flanges integrally formed with said casing to form a U-shaped channel, and a split ring of low friction shaft engaging material in said channel.

JOHN W. RUZICKA.